United States Patent [19]

Okey et al.

[11] 3,753,612

[45] Aug. 21, 1973

[54] FRAMING DEVICE FOR A CONTINUOUSLY MOVING MOTION PICTURE FILM

[75] Inventors: Bernard J. Okey, Redondo Beach; Daniel J. Marshall, San Pedro, both of Calif.

[73] Assignee: The Magnavox Company, Torrance, Calif.

[22] Filed: Nov. 10, 1971

[21] Appl. No.: 197,335

Related U.S. Application Data

[63] Continuation-in-part of Ser. No. 24,054, March 26, 1970.

[52] U.S. Cl.................................... 352/109, 352/92
[51] Int. Cl. .......................................... G03b 41/10
[58] Field of Search...................... 353/92, 106, 109, 353/105, 107; 178/DIG. 28, 6.7

[56] References Cited
UNITED STATES PATENTS

| | | | |
|---|---|---|---|
| 2,818,467 | 12/1957 | Harris et al. | 178/DIG. 28 |
| 2,843,006 | 7/1958 | Tyler | 352/109 |
| 3,067,284 | 12/1962 | Baldwin | 352/109 X |
| 3,459,471 | 8/1969 | Johnston | 352/105 |
| 3,539,250 | 11/1970 | Johnston | 352/106 |
| 3,594,581 | 7/1971 | Yamashita | 352/92 |

OTHER PUBLICATIONS
IBM Technical Disclosure Bulletin, Author – Lazarchick, Title – Motion Picture Cueing System, Vol. 11, No. 10, March 1969.

Primary Examiner—Samuel S. Matthews
Assistant Examiner—Alan Mathews
Attorney—Smith, Roston & Pavitt

[57] ABSTRACT

A device for framing a continuously moving motion picture film having a plurality of index marks, including a means for providing a beam of light for projecting images of index marks on the film or index marks directly related to the index marks on the film. A feed means continuously moves the film past the beam of light. A first detector is in alignment with the beam of light for receiving the projected images of the marks in alignment therewith for providing a coarse drive signal having an amplitude related to the position of the reflected image. A reflector is positioned to reflect the images of the marks in alignment therewith. A second detector is positioned to detect images reflected by the detector for providing a fine drive signal related to the positions of the received projected image. A drive assembly is coupled to receive the coarse drive signal and the fine drive signal for providing angular rotation to the reflector at a rate related to the instantaneous summation of the electrical amplitudes of the received signals.

30 Claims, 4 Drawing Figures

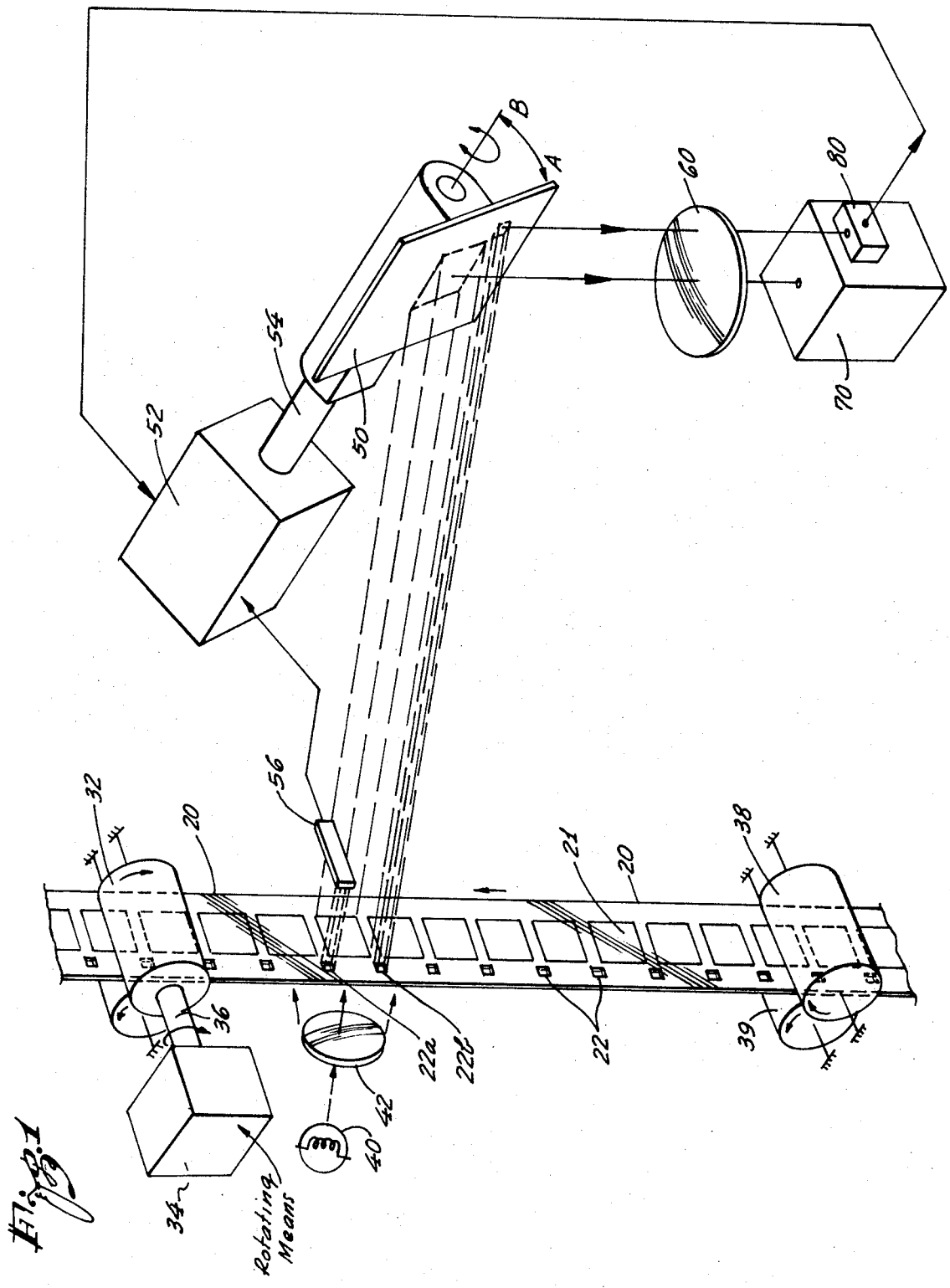

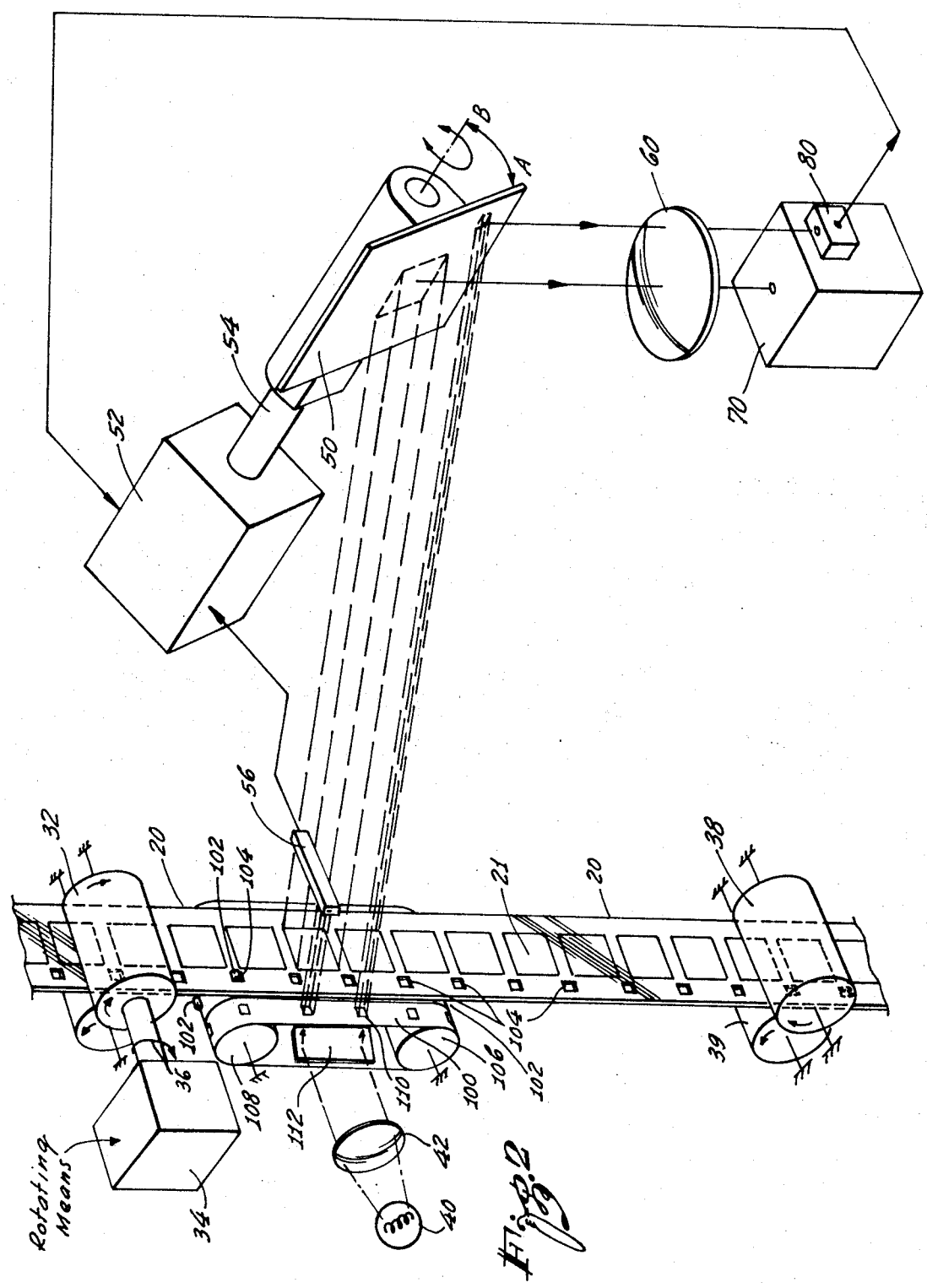

Patented Aug. 21, 1973
3,753,612
3 Sheets-Sheet 3
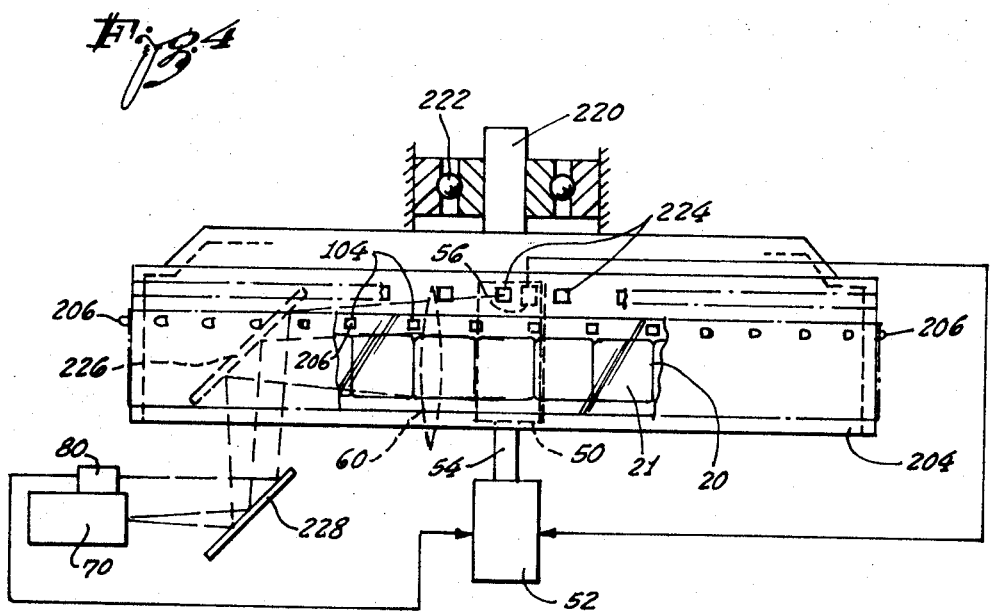
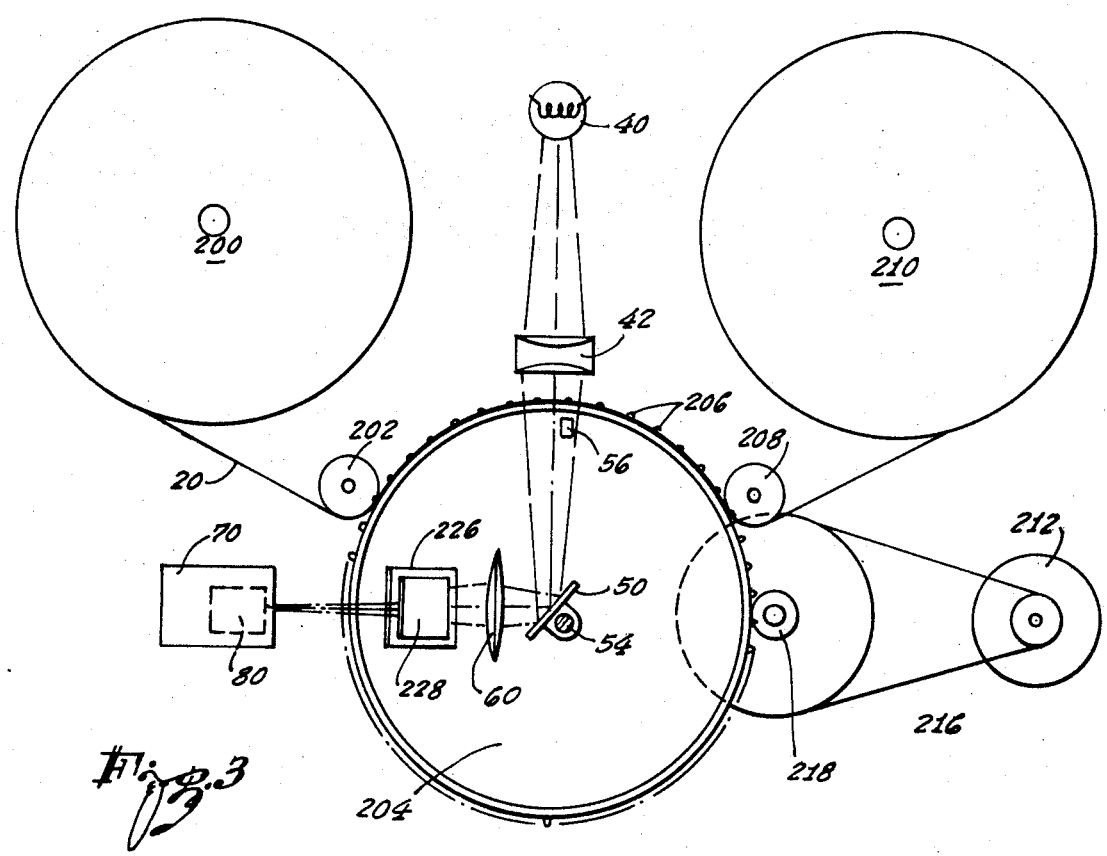

FRAMING DEVICE FOR A CONTINUOUSLY MOVING MOTION PICTURE FILM

BACKGROUND OF THE INVENTION

This is a continuation-in-part of application Ser. No. 24,054, filed Mar. 26, 1970.

FIELD OF THE INVENTION

This invention relates in general to a motion picture film framing device, and more particularly to a motion picture film framing device for a continuous motion motion picture film.

2. BRIEF DESCRIPTION OF THE PRIOR ART

In the projection of a motion picture film onto a readout device or a screen, a beam of light provided by a lamp is applied to the motion picture film. The beam of light passes through a lens and the motion picture film for projecting images of the frames on the readout devices. However, when the motion picture film is moved continuously instead of sequentially stepped, it is necessary to frame or synchronize the frames of the motion picture film so that it appears as a stationary image.

In the prior art, one method that has been used to frame the motion picture film is to perforate a plurality of sprocket holes along the edge of the motion picture film. An indexing finger engages the sprocket holes of the motion picture film and sequentially steps the motion picture film from frame to frame. The motion picture film is sequentially stepped and not continuously moved. However, with sprocket holes in the motion picture film, the film can easily tear at or near the sprocket holes if very thin film is used. Consequently, the motion picture film must be thicker than desired for some thin film applications.

Projectors have been used to project the images of the frames onto a readout device or screen for a continuous moving motion picture film that includes a uniformly rotating multiple mirrored drum wherein the mirrors are controlled by a single cam and individual cam followers so that the plane of each of the uniformly rotating mirrors intercepts the optical axis of the projection lens at a fixed point during its passage across the projection beam. The mirrors are oscillated about their movable axis individually. The several mirrors are parallel to the axis of the mirrored drum and equally spaced around the cylinder surface coaxially with the axis of the drums so that stationary images of the continuously moving frames of the motion picture film are projected onto a viewing screen or other detecting device. The oscillations of the individual mirrors are controlled by individual cam followers which contact the surface of the single stationary cam. Consequently, the projected images are reflected by the mirrors.

The above-described apparatus using a mirrored drum for framing a continuously moving motion picture film is illustrated in a patent, titled "Continuous Film Motion Projector for Television Cameras and Film Recorders," U.S. Pat. No. 2,718,549, filed June 13, 1960, in the name of Charles F. Mattke, and assigned to Bell Telephone Laboratories, Inc., a corporation of New York.

In the prior art as described above, the accuracy of the framing of the motion picture film is dependent upon the mechanical coupling of the various cams. Furthermore, the mirrors must be mechanically coupled to the means for moving the motion picture film to provide synchronizing of the mirror to the speed of the film. Consequently, as the mechanical components wear and deteriorate the drive, the framing of the motion picture film will be degraded. Therefore, it is desirable to have a motion picture apparatus for framing a motion picture film that requires no mechanical coupling between the framing device and the means for moving the motion picture film. Furthermore, for the use of thin film, it is desirable to have a framing apparatus that does not require the use of sprocket holes.

SUMMARY OF THE INVENTION

In the present invention, a motion picture film having a plurality of indexing marks is continuously advanced past a beam of light provided by a lamp. The beam of light passes through a lens and through the frames of the motion picture film including the index marks on the film or index marks directly related to the index marks on the film. Some of the beam of light passes through the frames of the motion picture film and is reflected by a mirror onto a readout camera or screen. Some of the beam of light passes through the indexing marks. The beam of light passing through particular index marks is in alignment with a first detecting means and is detected by the first detecting means for providing a coarse drive signal for driving the framing device. The coarse drive signal has an amplitude related to the position of the particular indexing marks in alignment therewith or is used as a trigger signal to trigger an electronic waveform generator which provides a waveform in synchronism with the film image.

A second detecting means is disposed adjacent to the readout camera or screen to receive light passing from the indexing marks. The second detecting means provides a fine drive signal. A drive assembly is coupled to receive the coarse drive signal and the fine drive signal for providing angular rotation to the reflector. The angular rotation of the reflector is related to a summation of the amplitudes of the coarse drive signal and the fine drive signal. Therefore, the image on each of a plurality of frames of the motion picture film is reflected by the reflector and appears stationary when received by a readout device.

In a first embodiment of the invention, the film includes index marks which are directly used to provide the coarse and fine drive signals. The index marks on the film may be developed portions of the film or sprocket holes if the surrounding area is opaque.

Second and third embodiments of the invention are directed for use with film including sprocket holes wherein the area surrounding the sprocket holes may be clear. In these embodiments, the sprocket holes are used as index marks by directly relating the sprocket holes to a second set of index marks. For example, in a second embodiment of the invention, a sprocketed belt containing index marks engages the sprocketed holes in the film and with the index marks on the belt used to provide the coarse and fine drive signal. In a third embodiment of the invention a sprocketed wheel containing index marks engages the sprocket holes in the film and with the index marks on the wheel used to provide the coarse and fine drive signals.

The above and other objects, features, and advantages of the present invention will become more readily apparent with reference to the accompanying detailed description taken in conjunction with the drawings.

FIG. 1 illustrates a first embodiment of the invention wherein the index marks on the film are directly used to provide coarse and fine drive signals;

FIG. 2 illustrates a second embodiment of the invention which includes a sprocketed belt including index marks, FIG. 3 illustrates a third embodiment of the invention which includes a sprocketed wheel including index marks; and FIG. 4 is a front view of the wheel of FIG. 3.

DESCRIPTION OF THE PREFERRED EMBODIMENT

Referring now to FIG. 1, there is shown an apparatus for framing a motion picture film 20. The motion picture film 20 has a plurality of developed frames 21 and a plurality of index marks 22. The index marks can be developed portions of the picture film 20, or may be sprocket holes if the surrounding area is opaque.

The motion picture film 20 is disposed between a pair a guide rollers 38 and 39, and between a drive roller 30 and a capstan 32. Motion is imparted to motion picture film 20 by the capstan 32, which is coupled to a rotating means 34 by a shaft 36. Therefore, rotation of the shaft 36 by the rotating means 34 causes a corresponding rotation of the capstan 32 for moving the motion picture film 20 past a beam of light from a source or lamp 40. Since the motion picture film 20 does not contain any sprocket holes or any other types of holes, the motion picture film 20 is moved by the capstan 32 and the drive roller 30 as a result of the friction developed between the capstan 32 and the motion picture film 20.

The beam of light provided by the lamp 40 passes through a condensing lens 42 and through the motion picture film 20, including the frames and index marks in alignment therewith. The condensing lens 42 focuses the filament image onto the mirror 50. A portion of the beam of light provided by the lamp 40 passes through the individual frames 21 in alignment with the beam of light and projects the information of the particular frames onto a mirror 50. The mirror 50 reflects the projected image through a projection lens 60 to a readout device 70, such as a readout camera. The projection lens operates to focus the reflected beam of light onto the readout device 70. However, since the motion picture film is continuously moved, it is necessary to oscillate or rotate the mirror 50 at a rate related to the rate of the motion picture film 20 for proper framing.

Oscillation of the mirror is provided by a mirror drive assembly 52 in response to a coarse drive signal provided or initiated by a first detector 56 and by a fine drive signal provided by a second detector 80. The first detector 56 can be a photocell and the second detector 80 means can be a differential photocell (null detector). The first detector 56 is in alignment with the beam of light near the motion picture film 40 and receives the light passing through the particular index mark in alignment with detector means 56. The coarse drive signal provided by the first detector 56 can be a sawtooth signal having a particular number of sawtooths that are related to the linear speed of the motion picture film 20. For example, if the motion picture film 20 moves at a linear speed of 24 frames per second, the coarse drive signal provided, or initiated, by the first photocell 56 will have 24 sawtooths per second.

The second detector 80 is coupled to receive the beam of light that passes through particular index marks in alignment with the mirror 50. The beam of light received by the second detector 80 is reflected by the mirror 50 from the index mark 22. The second detector 80 can be a differential photocell (null detector) that includes two individual photocells (not shown) separated by a particular distance. The second detector 80 provides no output signal if the beam of light received by the second detector 80 from the mirror 50 is in a center position that corresponds to the desired instantaneous alignment on the readout device 70 of the information on a frame of the motion picture film 20. However, if the projected index mark focused upon the second detector 80 is not properly positioned, it will produce an output signal for the fine drive signal. For example, if the projected index mark received by the second detector 80 deviates to a first side of the center position corresponding to insufficient angular rotation of the mirror 50, the second detector 80 provides the fine drive signal for imparting further angular rotation to the mirror 50. However, if the projected index mark received by the second detector 50 deviates to a second side of the center position corresponding to excessive angular rotation of the mirror 50, the second detector 80 provides the fine drive signal for decreasing the angular rotation of the mirror 50.

A mirror drive assembly 52 is coupled to receive the coarse drive signal and the fine drive signal for providing angular rotation to the mirror 50, wherein the rate of angular rotation is related to the velocity of the motion picture film 20. The drive assembly 52 is connected to the mirror 50 by a shaft 54 so that rotation of the shaft 54 by the drive assembly causes a corresponding rotation of the mirror 50. The instantaneous angular position of the mirror 50 with respect to the surface of the motion picture film 20 is related to the summation of the amplitude of the coarse drive signal and fine drive signal. Consequently, as a sawtooth of the coarse drive signal increases in amplitude, the drive assembly 52 rotates the mirror 50 from a first angular position, or position A, toward a second angular position, or position B. If, at any time, during the rotation of the mirror the light received by the second detector 80 deviates from the center position, the fine drive signal provides correction to the mirror assembly 52. At the end of the individual sawtooth, the amplitude of the sawtooth returns to substantially a reference voltage amplitude which cuases the mirror drive assembly to return the mirror 50 to the start position.

Referring now to the operation of the present invention in more detail, and to the framing of one of the frames 21 of the motion picture film 20, at the start of framing of a particular frame, the mirror 50 is in a start frame position A to reflect the frame of information to the readout device 70. At least a portion of the beam of light provided by the lamp 40 passes through the condenser lens 42 and through a first particular index mark 22a to the first detector 56. Simultaneously with the beam of light passing through the first particular index mark 22a, a portion of the beam of light passes through a second particular index mark 22b. The beam of light passing through the second particular index mark 22b is reflected by the mirror 50.

In one form of the invention the first detector 56 initiates a sawtooth output signal to the drive assembly 52 related to the amount of light received. As the motion picture film 20 is moved toward capstan 32, the amount of light received by the first detector increases causing a corresponding increase in amplitude of the sawtooth. In a second form of the invention, the first detector 56 initiates a waveform generator which produces a slope proportional to the film velocity. As the amplitude of the sawtooth increases, the mirror 50 is rotated by the drive assembly 52 in response to the received signal.

During the time that the angular position of the mirror 50 is being changed by the drive assembly 52, if the portion of the beam of light passign through the particular index mark 22b and reflected from the mirror 50 to the second detector 80 remains in the central or null position, the second detector 80 will provide no output signal indicating proper framing of the motion picture film 20. However, at any instant of time during the angular rotation of the mirror 50, if the beam of light received by the second detector 80 deviates from the center or null position, the second detector 80 will provide the output signal or the fine error signal to the mirror drive assembly 50 for correcting substantially instantaneously the angle of the mirror 50 with respect to the motion picture film 20 for proper framing.

If the mirror 50 has not rotated a sufficient amount for proper framing, the beam of light received by the second detector 80 will be off center and the second detector 80 will provide a positive fine drive signal having an amplitude related to the amount of error. The amplitude of the coarse drive signal is added to the amplitude of the fine drive signal by the drive assembly 52 to cause an increase in angular position of the mirror 50. If, however, the mirror 50 has rotated through a greater angle than desired for proper framing, the second detector 80 provides the fine drive signal having a negative amplitude which, when added to the coarse error signal by the drive assembly 52, would cause a corresponding decrease in angular rotation of the mirror 50 with respect to the surface of the motion picture film 20.

Once the ramp generator has been initiated, it will continue to produce a ramp output until the first detector 56 senses the presence of the next framing mark. The signal from the detector 56 causes the ramp generator to reset rapidly to its initial state thus driving the mirror to its original position (A). The error voltage provided by the second detector 80 is overpowered by the coarse drive voltage thus allowing the the coarse signal to return the mirror. When the mirror approaches its initial position, the second detector 80 looks onto the next framing mark and servos it into proper position. For example, if the mirror drive assembly has caused an angular rotation of the mirror 50 from position A to position B, as illustrated in the drawing, at the end of the framing of that particular frame, the mirror 50 would return almost instantaneously to position A.

The above-described process for a particular frame at the motion picture film 20 is repeated for each successive frame of the film 20.

With the present invention, very thin motion picture film 20 can be used because it is not necessary to have sprocket holes in the film or anything to tear or tip or degrade the motion picture film 20 in any manner. Since very thin motion picture film can be used, the amount of film stored on a reel of a particular diameter can be increased to provide a corresponding increase in playing time. Furthermore, wear on the film is minimized since the film is driven continuously at a substantially constant speed rather than being driven on an intermittent basis.

The system constituting this invention also provides other advantages of some importance. For example, the viewing of the film is controlled by the operation of a member such as a mirror rather than by changes in the speed of the film. Furthermore, the disposition of the mirror at each instant is controlled on a coarse and a fine basis as that each frame of the film can be seen without any jitter.

Although the present invention is adaptable to the use of very thin motion picture film, which does not have to have sprocket holes, at times it may be desirable to reproduce motion picture film which does not have sprocket holes. Unfortunately, most duplicate film is normally supplied with clear edges so that the sprocket holes themselves can not be used as the index marks. However, the sprocket holes may be used indirectly as the index marks so as to control the position of a separate device containing index marks so that the motion of the film is still controlled by a plurality of index marks which are associated with a frame on the motion picture film. The second and third embodiments of the invention therefore are directed to continuous-motion framing devices specifically for use with film containing sprocket holes. Members which are similar to those as shown in FIG. 1 are given the same reference characters.

In FIG. 2, a second embodiment of the invention is shown, which includes the use of a sprocketed belt member 100 including sprockets 102 which engage sprocket holes 104 in the motion picture film 20. The film 20 is disposed between the pair of guide rollers 38 and 39 and between an idler roller 30 and a capstan 32. The capstan 32 is driven by the rotating means 34.

The sprocketed belt 100 is supported for rotation on a pair of rollers 106 and 108. The belt 100 also contains a plurality of openings 110 which serve as index marks for use in providing the framing of the individual frames on the motion picture film 20. Specifically, each opening 110 is directly related in position to a sprocket 102 on the belt 100 and, of course, th sprockets 102 engage the sprocket holes 104 in the film 200 so that each index opening 110 is directly related to a particular frame on the motion picture film 20. The portion of the belt 100 adjacent the index holes 110 may be opaque and the portion of the belt 100 adjacent the frames on the motion picture film 20 would be transparent.

In order to accomodate the belt in a position adjacent to the individual frame being reproduced, a 45° mirror 112 receives the light energy produced by the light source 40 as focused by the condensing lens 42 to direct light energy through a frame on the motion picture film and also through an associated index hole 110 on the sprocketed belt 100. The remaining portion of the system including the first detector 56 for providing a coarse drive signal and a second detector 80 for providing a fine drive signal and the mirror 50 as controlled by the drive assembly 52 is substantially identical to that shown in FIG. 1.

It can be seen, therefore, that the embodiment of FIG. 2 will provide for a framing device for motion picture film wherein the film includes sprocket holes which are indirectly used to provide indexing marks by the use of a sprocketed belt member containing sprocket teeth and indexing openings which provide for each indexing opening serving as an indexing mark relative to a particular frame on the motion picture film. The sprocketed belt member 100 may either be driven in synchronism with the capstan 32, or the belt member may be allowed to freely move with the motion picture film 20 as it is driven by the capstan 32. The belt therefore would actually be driven by the cooperation between the sprockets 102 on the belt 100 as the sprockets are engaging the openings 104 in the motion picture film 20.

Referring to FIGS. 3 and 4, a third embodiment of the invention is shown for use with film containing sprocket holes and using a large sprocketed wheel or drum to both provide movement of the film and, in addition, provide for framing of the film with a continuous motion. The film is supplied from a film supply reel 200 and passes over an idler wheel 202 to a sprocketed drum 204. The film 20 includes the sprocket holes 104 and the sprocket holes 104 are engaged by teeth 206 contained on the drum 204. Film 20 then passes over a second idler wheel 208 to a film take-up reel 210.

A motor 212 drives a fly-wheel 214 through a belt 216. Mounted on the same shaft as the fly-wheel 214 is a pinch wheel 218 which engages a smooth portion of the sprocketed 204 so as to drive the sprocket wheel 204 and thereby also provide for motion of the film 20. The sprocketed wheel 204 is mounted on a shaft 220 which is supported by bearings 222 so as to provide for a free rotation of the sprocketed wheel 204.

The remaining portion of the system is generally similar to that shown in FIGS. 1 and 2 and the same reference characters are used. Specifically, the light source 40 directs light energy to a condenser lens 42 so as to pass the light energy through the film 20. In addition, in order to provide index marks, the sprocketed wheel 204 also includes framing apertures 224 which act as index marks. The framing apertures 224 are related to the sprockets 206 so that when the sprockets engage the openings 104 in the film 20 each framing aperture 224 is directly related to an associated frame on the film 20.

The light energy passes through both the motion picture film 20 and the framing apertures 224 and is directed to the mirror 50. A portion of the light energy from a particular framing aperture 224 is also directed to the first detector 56. The mirror 50 is controlled by the mirror-drive assembly 52 to provide proper framing. Specifically, the mirror-drive assembly is operated in response to the coarse drive signal provided or initiated by the first detector 56 and by the fine drive signal provided by the second detector 80. In order to provide for the light energy to be passed to the second detector 80 and the readout device 70, an additional pair of 45° mirrors 226 and 228 is used so as to direct the light energy in the proper direction.

In a preferred configuration, the sprocketed wheel 200 has a relatively large diameter such as 6 inches. The large diameter keeps each film frame essentially flat.

The embodiment of FIGS. 3 and 4 has several advantages. For example, the system eliminates the need for a fixed gate; the system also allows for the installation of a vacuum device on the backside of the wheel to thereby provide for continuous self-cleaning. In addition, since the film is not passed by a fixed gate or other fixed surface, there is no opportunity for the film to become scratched. Other advantages are that the system may be easily adapted to cartridge loading and the use of the wheel keeps the frame at a fixed distance throughout the arc of the mirror scan. As a further advantage of the large sprocketed wheel, a plurality of sprocket teeth can be engaged simultaneously with the film to thereby convey the film at a more uniform rate than would be possible with a smaller diameter sprocket wheel. It can be seen, therefore, that the embodiment of FIGS. 3 and 4 have several distinctive advantages over the prior art structure.

While the salient features of the present invention have been illustrated and described with respect to particular embodiments of the present invention, it should be readily apparent that modifications could be made within the spirit and scope of the invention.

What is claimed is:

1. In a motion picture film device wherein the motion picture film has a plurality of developed frames and including a plurality of index marks each associated with a different frame, a framing system, including:
   means for providing a beam of light to the developed frames and the index marks for projecting images of the index marks and the frames,
   feed means for providing continuous motion for moving the developed frames and the index marks past the beam of light,
   first detector means for receiving the projected images of the index marks and for providing a coarse drive signal having an instantaneous amplitude representing the desired position of the projected image of individual index marks with respect to the first detector means,
   movable reflector means including drive means for reflecting the projected images of the individual frames and index marks and with said drive means coupled to receive the coarse drive signal for moving the reflector means for framing the projected images in response to the coarse drive signal, and
   second detector means for receiving the reflected images of the projected images of the index marks and for providing a fine drive signal having an instantaneous amplitude representing any errors in the framing of the reflected image of the projected image of the individual index marks with respect to the second detector means and with the drive means coupled to receive the fine drive signal for moving the reflector means for correcting errors of the projected images in response to the fine drive signal.

2. The framing device of claim 1 wherein the first and second detector means include photocells.

3. The framing device of claim 1 wherein the motion picture film contains sprocket holes associated with the different frames and with the framing system including a sprocketed member for engaging the sprockets of the motion picture film and with the sprocketed member including the index marks.

4. The framing device of claim 3 wherein the sprocketed member is a belt member.

5. The framing device of claim 3 wherein the sprocketed member is a wheel member.

6. The framing device of claim 5 wherein the sprocket wheel member is also part of the feed means.

7. The framing device of claim 1 wherein said reflector means includes:
   a mirror for reflecting the projected images of individual frames of the motion picture, and the drive means providing angular rotation to the mirror, the drive means coupled to receive the coarse and fine drive signals for providing angular rotation to the mirror in response to the received signals.

8. The framing device of claim 7 wherein the first and second detector means include photocells.

9. In a motion picture film device wherein the motion picture film has a plurality of developed frames and additionally including a plurality of index marks individually associated with the developed frames, a framing device, comprising:

means for providing a beam of light to the index marks and the frames for projecting images of the index marks and the frames, feed means for providing continuous motion to the frames and index marks past the beam of light, a first detector in alignment with the beam of light for receiving the projected images of the index marks, the first detector providing a sawtooth coarse drive signal having an instantaneous amplitude representing the desired position of the projected image of individual index marks with respect to the first detector, a reflector for reflecting the projected images of the index marks and the frames of the motion picture film, a second detector in alignment with the reflected image of the index marks for providing a fine drive signal having an amplitude representing any deviation from a desired constant position of the reflected images with respect to the second detector, and a drive means coupled to receive the coarse drive signal and the fine drive signal for providing angular rotation of the reflector wherein the angular rotation of the reflector represents the summation of the amplitudes of the received signals.

10. The framing device of claim 9 wherein the second detector is a differential photocell.

11. The framing device of claim 9 wherein the reflector is a mirror.

12. The framing device of claim 9 wherein the motion picture film contains sprocket holes associated with the different frames and with the framing system including a sprocketed member for engaging the sprockets of the motion picture film and with the sprocketed member including the index marks.

13. The framing device of claim 12 wherein the sprocketed member is a belt member.

14. The framing device of claim 12 wherein the sprocketed member is a wheel member.

15. The framing device of claim 14 wherein the sprocket wheel member forms part of the feed means.

16. In combination for providing a controlled readout of a continuously moving film having a plurality of frames of images and additionally including a plurality of index marks each associated with a different frame, means for providing a projection of the images on the successive frames and a projection of the index marks associated with the successive frames, a readout means for providing a readout of the images on the successive frames of the film, movable optical means for receiving the projected images and index marks and directing the projected images and index mark toward the readout means, first control means for detecting the projected index marks to produce the first control signals representing the continuous movement of the film, driving means responsive to the first control signals for moving the optical means in accordance with the characteristics of the first control signals, to obtain a direction of the projected images to the readout means in a substantially constant relationship to the readout means during the movement of the frames past the projecting means, and second control means for detecting the index marks directed by the movable optical means to produce second control signals representing any change from the substantially constant relationship in the direction of the projected images to the readout means, and the driving means responsive to the second control signals for adjusting the movements of the optical means in accordance with the second control signals.

17. The combination set forth in claim 16 wherein the optical means includes a pivotable reflector and wherein the driving means operates to pivot the reflector.

18. The combination set forth in claim 16 wherein the first and second control means, respectively, include photocells.

19. The combination set forth in claim 16 wherein the second control means includes a differential photocell.

20. The combination of claim 16 wherein the film contains sprocket holes associated with the different frames and additionally including a sprocketed member for engaging the sprockets of the film and with the sprocketed member including the index marks.

21. The combination of claim 20 wherein the sprocketed member is a belt member.

22. The combination of claim 20 wherein the sprocketed member is a wheel member.

23. The combination of claim 22 wherein the sprocketed wheel member provides the continuous movement of the film.

24. In combination for providing a controlled readout of a continuously moving film having a plurality of frames of images and additionally including a plurality of index marks each associated with a different frame, first means for detecting the index marks associated with each successive frame, movable optical means for providing a direction of the image on each frame and the index marks during the movement of the frame and index marks, second means coupled to the first means and responsive to the index marks detected by the first means for moving the optical means at a speed representing the movement of the film to provide a substantially constant direction of the image on each successive frame and of each index mark, third means positioned adjacent to the optical means for sensing the image on each successive frame during the movement of the frame, fourth means positioned adjacent to the optical means for detecting any changes from the substantially constant direction of the index mark by the optical means during the movement of the frame, and fifth means responsive to the index marks detected by the fourth means and coupled to the second means for adjusting the movements of the optical means to compensate for any changes from the substantially constant direction to synchronize such movements with the continuous movement of the film.

25. The combination set forth in claim 24 wherein the optical means is movable relative to the film and the third means for providing a projection of each frame on a third means during the movement of the frame.

26. The combination set forth in claim 25 wherein the optical means includes a mirror which is pivotable to provide its movement.

27. The combination of claim 24 wherein the film contains sprocket holes associated with the different frames and additionally including a sprocketed member for engaging the sprockets of the film and with the sprocketed member including the index marks.

28. The combination of claim 27 wherein the sprocketed member is a belt member.

29. The combination of claim 27 wherein the sprocketed member is a wheel member.

30. The combination of claim 29 wherein the sprocketed wheel member provides the continuous movement of the film.

* * * * *